July 28, 1964 J. W. RONEY 3,142,368
ELECTRICAL COLLECTOR ASSEMBLY
Filed Nov. 29, 1962 2 Sheets-Sheet 1
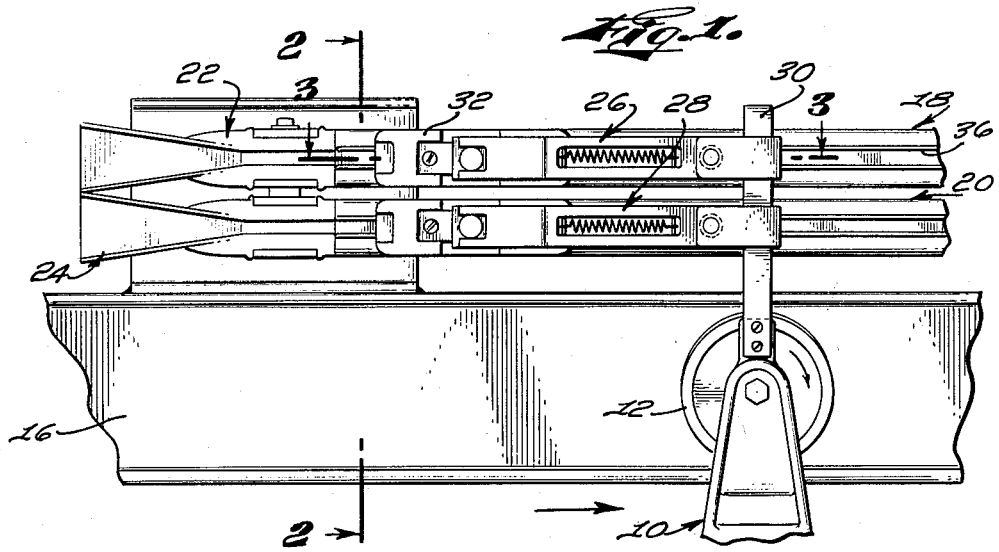
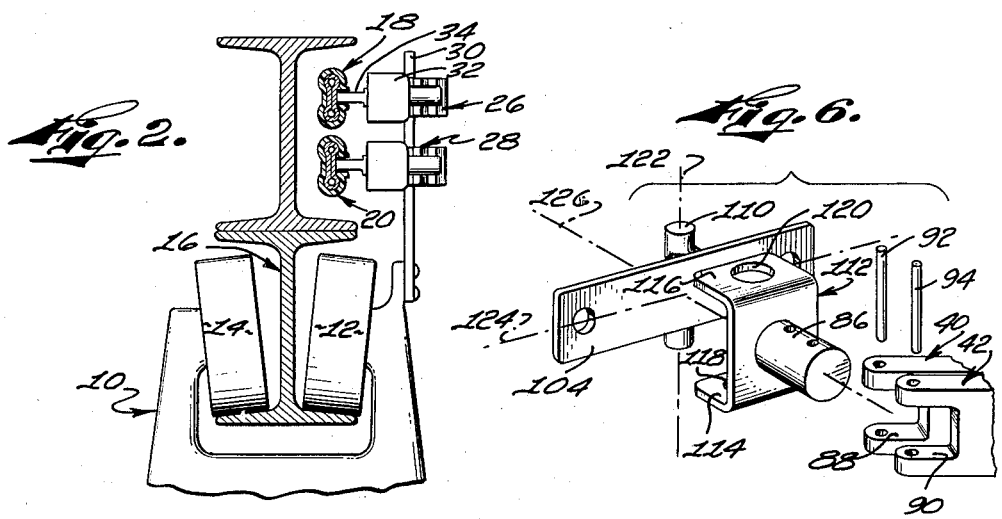
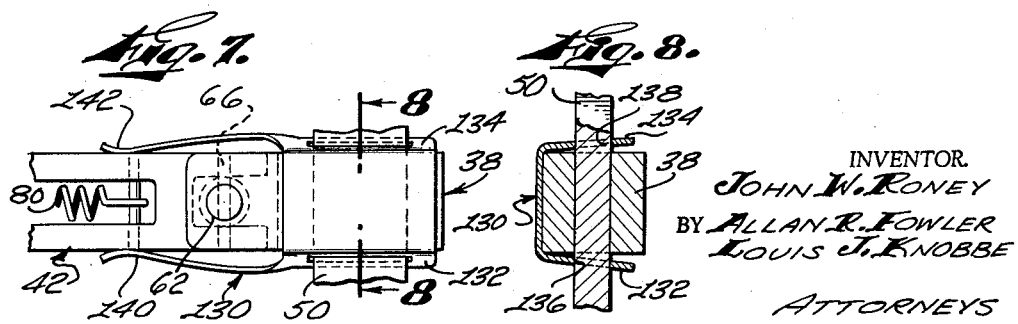
INVENTOR.
JOHN W. RONEY
BY ALLAN R. FOWLER
LOUIS J. KNOBBE
ATTORNEYS July 28, 1964 J. W. RONEY 3,142,368
ELECTRICAL COLLECTOR ASSEMBLY
Filed Nov. 29, 1962 2 Sheets-Sheet 2
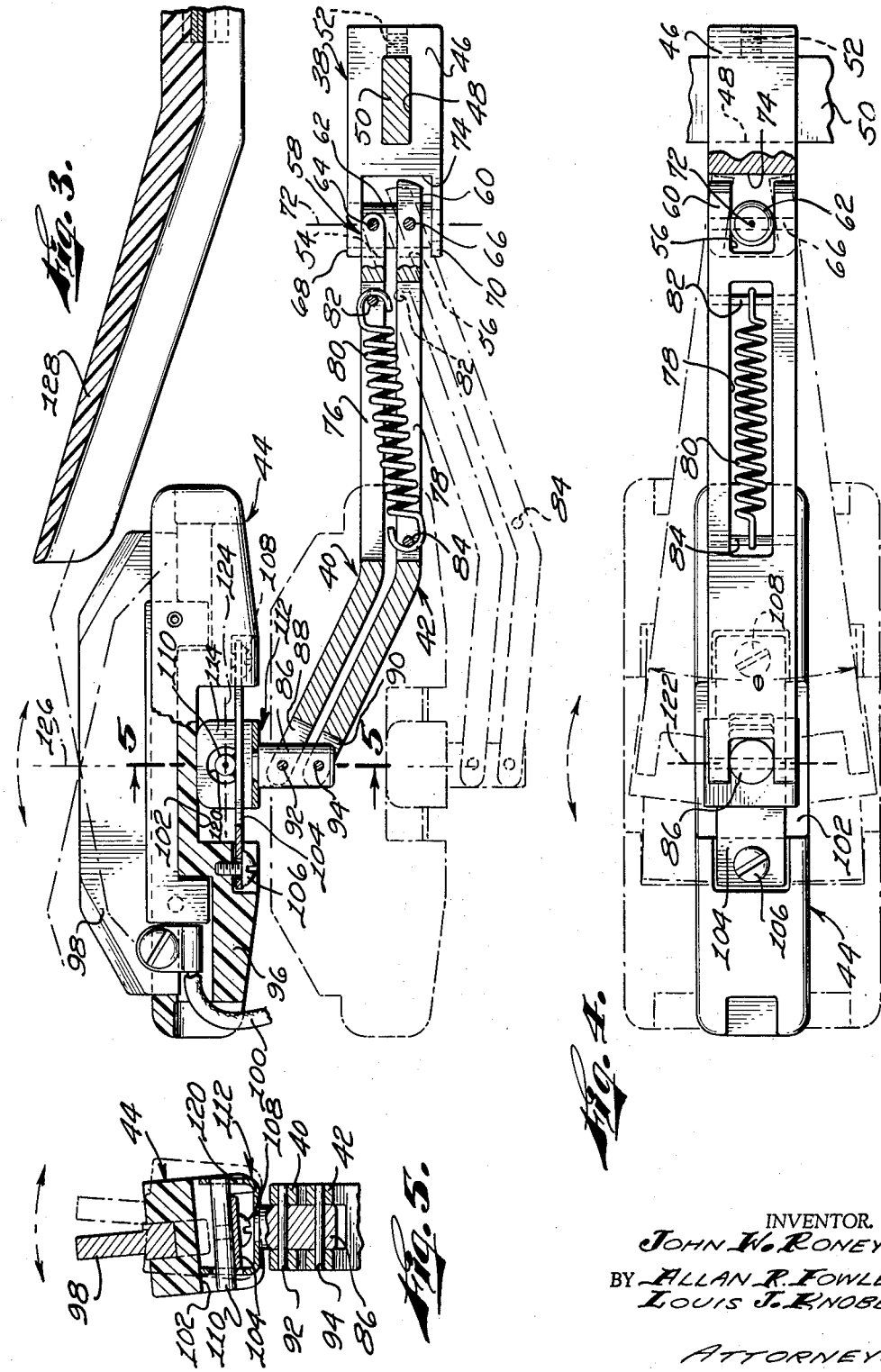
INVENTOR.
JOHN W. RONEY
BY ALLAN R. FOWLER
LOUIS J. KNOBBE
ATTORNEYS

United States Patent Office 3,142,368
Patented July 28, 1964

3,142,368
ELECTRICAL COLLECTOR ASSEMBLY
John W. Roney, Los Altos, Calif., assignor to Insul-8 Corp., San Carlos, Calif., a corporation of California
Filed Nov. 29, 1962, Ser. No. 240,841
7 Claims. (Cl. 191—45)

This invention relates to electrical collectors adapted to be mounted on one of two relatively movable structures for traveling engagement with electrical conductor bars which extend along the other structure. The invention has particular reference to an electrical collector assembly which accommodates a variety of motions along the path of travel while maintaining a relatively constant pressure against the conductor bar, under crowded conditions.

Electrical collectors find their major application in so-called "trolley electrification systems" wherein electric power is to be supplied to mobile machinery, for example to an electric hoist mounted on a carriage suspended on wheels which roll along a supporting rail. Usually, one or more conductor bars are supported from and extend along the rail, and a corresponding number of electrical collectors are mounted on the carriage and held in engagement with the conductor bars as the carriage moves along the rail. The conductor bar system frequently includes switches, interlocks, curves and discontinuities bordered by pick-up guides, all of which the collectors are expected to negotiate. These conditions, coupled with non-uniformities in spacing and in the travel of the carriage along the rail, make it desirable to provide a collector assembly which will accommodate a variety of motions relative to the structure on which it is mounted, while maintaining a substantially constant pressure against the conductor bars. The problem is compounded by the requirement, in many instances, for a collector assembly which will reside and so operate within a very restricted space.

In accordance with the present invention, a collector assembly utilizes two spaced apart arms connected between the collector base and the collector head in a parallelogram type pivot linkage. A coil spring is contained on the arms and urges the arms about their pivot axes for engaging the collector head with a conductor bar. The coil spring is several times longer than the distance between the spaced apart arms and is connected diagonally between the spaced apart arms and is connected diagonally between and along the centerlines of the arms so that the force exerted by the collector head against the conductor bar remains substantially constant and relatively independent of the separation between the conductor bar and the mounting base of the collector assembly.

More specifically, and in accordance with one embodiment of the present invention, an electrical collector assembly for solving the above and allied problems basically comprises a pair of supporting arms extending longitudinally away from a mounting base in spaced and approximately parallel relationship, together with means connecting the near ends of the arms to the base and the far ends of the arms to a collector head on spaced parallel pivot axes. In combination with the foregoing, a coil spring is contained on the arms at a position between the mounting base and the collector head. The arms have accommodating slots formed therein, and the coil spring extends from within the confines of the slots and diagonally between the arms. The coil spring is coupled at opposite ends to opposite arms.

In accordance with one embodiment of the invention, the arms are spaced closely adjacent one another and the slots therein register with one another. The coil spring is contained substantially within the registering slots in the arms, and extends nearly parallel to the arms. The spring is held under tension, which tension remains substantially constant within acceptable limits of turning movement of the arms about the base.

Also in accordance with one embodiment of the invention, the arms have a common bend therein located remote from the ends thereof and away from the position of the spring. The coil spring is disposed adjacent the arms on one side of the bend, and urges the arms about the base in the concave direction of the bend. The means connecting the near ends of the arms to the base includes an arm support journaled to the base on an axis approximately perpendicular to the arm pivot axes, with means provided for limiting the angular movement of the arm support in its journal to a small angle and with means provided for limiting turning movement of the arms about the base under the influence of the coil spring. The means connecting the far ends of the arms to the collector head may include a collector head support to which the arm pivotal connections are made, and means providing limited freedom of turning movement about each of three mutually perpendicular axes for connecting the collector head to the collector head support. Thus, movement of the collector head relative to the base in all directions is provided, yet the construction assures that the assembly remains within restricted space limitations and that the collector head, when disengaged, is properly positioned to enter a pick-up guide.

These and other important cooperative constructions in accordance with the invention are described in greater detail with reference to a preferred embodiment thereof illustrated in the accompanying drawings, in which:

FIG. 1 is a fragmentary side view of a rail mounted carriage with discontinuous conductor bars mounted along the rail and with corresponding collector assemblies mounted on the carriage;

FIG. 2 is a fragmentary sectional elevation taken along line 2—2 of FIG. 1;

FIG. 3 is a side elevation, partly in section, of a preferred embodiment of a collector assembly constructed in accordance with the invention, together with a fragmentary sectional view of a conductor bar and pick-up guide, and together with phantom lines illustrating several possible pivotal movements in the collector assembly;

FIG. 4 is a bottom elevation of the collector assembly of FIG. 1, also illustrating in phantom line some possible pivotal movements of the assembly;

FIG. 5 is a fragmentary sectional elevation taken along line 5—5 of FIG. 3;

FIG. 6 is an exploded view illustrating means employed in connecting the far ends of the arms to the collector head;

FIG. 7 is a fragmentary elevation of a spring clip engaged over the mounting base of the collector assembly for serving the dual purpose of releasably fixing the position of the base on a mounting bar and centering the pivotal position of the arms as illustrated in FIG. 4; and, FIG. 8 is a fragmentary sectional elevation taken along line 8—8 of FIG. 7.

Referring now to FIGS. 1 and 2, a carriage 10 is suspended on wheels 12, 14 which roll along the lower flange of a supporting rail 16. The carriage 10 may carry an electrically powered hoist or other equipment (not shown). A pair of side contact, insulated conductor bars 18, 20 are supported on and extend along the rail 16 to a position where each terminates in a pick-up guide 22, 24 respectively.

A pair of collector assemblies 26, 28 are supported in close side-by-side relationship on a mounting bar 30 which extends rigidly from the carriage. Typically, each collector assembly 26 includes a collector head 32 having a contact or shoe 34 which engages the corresponding conductor bar 18 in sliding contact. As shown, each conductor bar 18 has an open longitudinal contact slot along one side thereof for receiving the shoe 34 of a collector. Electric power is carried over the conductor bars through the collectors, and thence over cables (not shown) to the carriage.

As can be appreciated by viewing FIG. 2, variations in the conductor bars and in the way they are mounted will cause their vertical and horizontal positions as well as their orientations relative to the carriage to change to some extent as the carriage travels along the rail. A certain amount of wobbling and meandering motion in the carriage will occur as it travels along the rail, thus contributing to the variations. Furthermore, the collectors may be expected to negotiate curves, switches, and interlocks (not shown), and may be expected to be disengaged over certain spans of the rail 16 to be picked up again by the pick-up guides 22, 24 and reseated on the conductor bars. These factors make it desirable that the collector assemblies be capable of a variety of limited motions relative to their mounting.

Referring to FIGS. 3 and 4, a collector assembly capable of such motions includes a mounting base 38, a pair of supporting arms 40, 42, and a collector head 44.

The base has a body portion 46 of rectangular cross-section, with a rectangular opening 48 extending therethrough for receiving a mounting bar 50, the cross-section of which approximately matches the rectangular opening 48. The base is releasably fixed at any position along the mounting bar by means of a set screw 52 threaded through the rear of the body portion of the base.

The pairs of arms 40, 42 extend longitudinally away from the base 38 in closely spaced and parallel relationship. The near ends of the arms 40, 42 have open center slots 54, 56 therein defining a pair of legs 58, 60 at the near ends of the arms 40, 42 respectively.

An arm support post 62 extends through the open center slots 54, 56 at the near ends of the arms and interconnects the near ends of the arms on two spaced pivot axes by means of a pair of pins 64, 66 extending through the arm support 62 and through the leg pairs 58, 60 respectively. The two spaced pivot axes are defined by the pins 64, 66 respectively.

The arm support post is journaled between a pair of spaced extensions 68, 70 from the base 38, on an axis 72 which is perpendicular to the arm axes 64, 66. The spaced base extensions 68, 70 define an open rectangular slot 74 adjacent the front end of the body portion 46 of the base. The pair of legs 60 at the near end of the outer arm 42 extend past the arm support post 62 toward the base, and terminate a predetermined distance from the bottom of the rectangular base slot 74 in order to limit turning movement of the arm support about its axis 72 to a selected small angle θ, as best illustrated in FIG. 4 in phantom lines.

The arms 40, 42 each have a substantial bend in the same direction at an intermediate position remote from the ends thereof, as best seen in FIG. 3.

On the near side of the common bend, the arms have registering longitudinal center slots 76, 78 formed therein, within the confines of which is contained a coil spring 80 which extends diagonally between and approximately along the longitudinal direction of the arms or, in other words, the coil spring extends along the centerlines of the arms and is several times longer than the spacing between the arm pivot axes. Opposite ends of the coil spring are connected to opposite arms by means of a pair of pins 82, 84, so that the spring 80, under tension, urges the arms 40, 42 to turn about the base 38 in the concave direction of the common bend in the arms, which is the direction which engages the collector head 44 with a conductor bar.

Turning movement of the arms about the base in this direction is limited to a predetermined maximum position, shown in solid lines in FIG. 3. This is accomplished by locating the pin 64 defining the arm pivot axis of the inner arm 40 a predetermined distance from the base extension 68. The confines of the rectangular base slot 74 limit the movement by abutting the inner arm 40.

The maximum position in the opposite direction about the base is indicated in phantom lines in FIG. 3. Again the limit is set by abutment of an arm, in this case the outer arm 42, against the confines of the rectangular base slot 74.

The far ends of the supporting arms 40, 42 are interconnected on two spaced pivot axes by means of a collector head support post 86. In this respect the support arms 40, 42 have open slots 88, 90 at their far ends through which the post 86 extends, and a pair of pins 92, 94 extend respectively through the leg portions of the arms 40, 42 thus formed, and through the post 86. The pins 92, 94 define the spaced pivot axes.

The collector head 44 includes an electrically insulative body 96, a conductive contact or shoe 98 mounted in and protruding from the body, and a cable 100 for making electrical connection through the body to the collector shoe.

As best seen in FIGS. 3, 5 and 6, the collector body 96 has a slot 102 formed in the bottom thereof, the slot being bridged by a flat bar 104 loosely connected to the collector body by a pair of screws 106, 108 which bottom in the body prior to tightening against the bar. A rod 110 extends transversely of and is connected by welding to the bar 104. Opposite ends of the rod protrude past the bar so as to form a pair of lugs extending oppositely from the collector head. A yoke 112 is rigidly connected to the collector head support post 86. The yoke 112 has two spaced arms 114, 116 which straddle the bar 104. Each yoke arm 114, 116 has an opening 118, 120 therein which is substantially larger than the cross-section of the rod 110. The opposite ends or lugs of the rod 110 are loosely caught in the yoke arm openings 118, 120 respectively.

The loose connection between the collector head 44 and its supporting post 86 provides limited freedom of turning movement about each of three mutually perpendicular axes, 122, 124, 126. The yoke 112 has a sufficient extent transversely of the rod 110 to limit turning movement of the collector head about the first axis 122 to a selected predetermined small angle. This movement is illustrated by the phantom lines and arrow near the top of FIG. 3, and is limited by the binding action of the yoke 112 and rod 110 on the bar 104.

Movement about the second axis 124 is best illustrated in FIG. 5, wherein it may be seen that the movement is limited to a small angle by the rod 110 abutting the edge of the opening in one yoke arm and by the opposite yoke arm abutting the bottom of the slot 102 in the collector body 96. The loose connection of the bar 104 to the collector body permits the bar to tilt somewhat to facilitate this movement.

Movement about the third axis 126 is limited by the rod 110 abutting edges of the yoke arm openings 118, 120. This movement is best seen from the phantom lines in FIG. 4, illustrating that the collector 44 may be required to remain straight while the arms pivot about axis 72 of the arm support post 62.

The common bend in the arms and the location and orientation of the coil spring give the collector a low silhouette in its operating position. Yet, the collector assembly provides for substantial but limited motions of the collector head in all directions with respect to the mounting base, except in the longitudinal direction in which the collector head is pushed or pulled along the conductor bar.

Furthermore, the common bend in the arms permits the base to be located more nearly in the line of travel of the collector head, which facilitates sliding motion of the collector in either direction along a conductor bar, and especially through curves, switches and interlocks where otherwise difficulty is sometimes encountered.

As illustrated in FIG. 3, the collector assembly is about to engage a pick-up guide 128. The entire collector assembly is disposed horizontally and, as best illustrated in FIG. 6, the collector head is resting under the influence of gravity against a limit of its motion about axis 124. The collector is shown in its disengaged position, which is its limited maximum inward position under the influence of the spring 80. As the collector travels through the pick-up guide 128 it will move outward to a mean or operating position, somewhere between the solid line position and the phantom line position shown in FIG. 3. In this regard, the collector should have a stroke of roughly ⅜ inch inward or outward from its mean position.

Referring to FIG. 3 the four arm pivot axes defined by the pins 64, 66 and 92, 94 respectively, are disposed parallel to one another and located so as to form the corners of a parallelogram in a plane normal to the axes. Thus, the supporting post 86 for the collector head retains its same orientation as the arms 40, 42 pivot about the four arm axes between the two extreme positions of its stroke, shown in solid and in phantom lines respectively.

For proper operation, the collector must exert a predetermined amount of force against the conductor bar along which it rides. Too large a force will cause undue wear of the collector shoe, and too small a force will result in arcing, which rapidly deteriorates the collector shoe.

The required pressure, usually about 4 or 5 pounds, is provided by the coil spring 80 which is constantly in tension. The coil spring 80 is engaged under this predeterminted state of tension when the collector head is in its innermost position, indicated by the solid lines in FIG. 3. As the collector head moves outwards to the phantom line position, the considerable movement at the far end of the supporting arms 40, 42 produces only a small extension of the coil spring 80 so that the variation in spring tension is small, and for practical purposes the spring tension can be said to be substantially constant throughout the stroke of the arms.

Of course, as the collector head approaches the pick-up guide, it may be cocked in most any direction about the three pivot axes 122, 124, 126, and no doubt will be tilted under the influence of gravity about the pivot axis 72 of the arm support post 62 to the lower position illustrated in FIG. 4. The flat outer extremities of the yoke arms 114, 116, however, help keep the disengaged collector head parallel to the longitudinal direction, as best seen in solid lines in FIG. 3. Thus, the limits of movement about the various axes must be established so as to permit entry of the collector head onto the pick-up guide 128 under the most extreme conditions, and in either the push or pull longitudinal direction.

The various pivotal motions are also limited in order to confine the collector assembly to as small a volume of space as possible. Considering space requirements, typical dimensions for the collector assembly are an approximately uniform width along the assembly of one inch as seen in FIG. 4, a height in the operating position of approximately 2¼ inches which is approximately that illustrated in phantom line in FIG. 3, and an overall length, measured along the longitudinal direction in FIG. 3 of about 8½ inches.

Referring to FIG. 4, the collector should permit ½ inch up and down movement from the mean position shown in solid lines, about the pivot axis of the arm support post 62.

The form of loose connection provided by the yoke 112, bar 104 and rod 110, together with the wide swinging movements illustrated generally in phantom line in FIGS. 3 and 4, especially adapt this collector assembly for use with higher speed systems, such as passenger carrying monorails.

Referring now to FIGS. 7 and 8, a U-shaped spring clip 130 is engaged over the rectangular body portion of the mounting base 38 of the collector assembly. The spring clip has two legs 132, 134 in each of which is formed an opening 136, 138 respectively. These openings approximately match the outline of the mounting bar 50. The legs 132, 134 are sprung outwardly so as to bind against the mounting bar 50, and in that way to releasably fix the position of the base 38 on the mounting bar.

A pair of leaf spring portions 140, 142 are formed integrally with the spring clip, and extend longitudinally alongside the arms 40, 42. The leaf spring portions are disposed approximately normal to the arm pivot axes, such as axis 66, and are opposed against opposite sides of arms for urging the arms to a predetermined central position about the pivot axis 72 of the arm support post 62. This central position is the solid line position in FIG. 4.

The leaf springs 140, 142 form a self-centering feature which facilitates the engagement of the collector head 44 with a pick-up guide 128. Due to their orientation and location, they occupy little space and do not interfere with pivotal movement of the arms about the four arm axes defined by the pins 64, 66 and 92, 94.

I claim:

1. An electrical collector assembly having a collector head for contacting a conductor bar of an electrification system comprising a mounting base, a collector head, a pair of approximately parallel spaced apart supporting arms extending between the mounting base and collector head, means pivotally connecting opposite ends of the arms to the mounting base and collector head on spaced parallel pivot axes, and a coil spring several times longer than the spacing between said arms contained on the arms at a position between the mounting base and collector head for urging the arms about their pivot axes so that the force the collector head exerts against its conductor bar will remain substantially constant and relatively independent of the separation between the conductor bar and the mounting base of the collector assembly, the arms having accommodating slots formed therein, the coil spring extending from within the confines of the slots and diagonally between the arms, and opposite ends of the coil spring being coupled to opposite arms.

2. An electrical collector assembly having a collector head for contacting a conductor bar of an electrification system comprising a mounting base, a collector head, a pair of approximately parallel supporting arms spaced closely adjacent one another and extending between the mounting base and collector head, means pivotally connecting opposite ends of the arms to the mounting base and collector head on spaced parallel pivot axes, and a coil spring several times longer than the spacing between said arms contained on the arms at a position between the mounting base and collector head for urging the arms about their pivot axes so that the force the collector head exerts against its conductor bar will remain substantially constant and relatively independent of the separation between the conductor bar and the mounting base of the collector assembly, the arms having accommodating slots therein which approximately register with one another, the coil spring being substantially contained within the confines of the registering slots and extending nearly parallel to the arms, with opposite ends of the spring being coupled to opposite arms and the spring extending under predetermined tension between the arms.

3. The electrical collector assembly of claim 2, wherein the pair of arms have a common bend therein located away from the position of the spring and which faces concavely toward the direction in which the arms are urged by the spring for accommodating the outline of the collector head when the arms are pivoted against the action of the spring.

4. An electrical collector assembly according to claim 2 wherein the means pivotally connecting the arms to the collector head comprises a post to which the arms are pivotally connected on spaced parallel pivot axes, a yoke connected to the post, the yoke having two spaced arms, a pair of lugs extending oppositely from the collector head, each of the yoke arms having an opening therein substantially larger than the cross-section of one of said lugs, said lugs being loosely caught in said yoke arm openings.

5. An electrical collector assembly according to claim 2 wherein the mounting base has a slot in it, wherein the means pivotally connecting the arms to the mounting base comprises a post to which the arms are pivotally connected on spaced parellel pivot axes, the post being in turn pivotally connected to the mounting base on a pivot axis which extends across the confines of said mounting base slot in a direction perpendicular to the arm pivot axes, and wherein the ends of the arms connected to the post have a dimensional relationship with the confines of the mounting base slot which restricts movement of the arms on their pivot axes and the post on its pivot axis to predetermined limits by abutment of the ends of the arms with the surfaces of the mounting base slot.

6. An electrical collector assembly according to claim 5, wherein a pair of opposing leaf springs extend from the base against opposite sides of the pair of arms for urging the post to a predetermined center position about its pivot axis.

7. An electrical collector assembly having a collector head for engaging a conductor bar of an electrification system comprising, in combination, a mounting base; a collector head; a pair of approximately parallel arms pivotally connected at one set of their ends on spaced apart axes to said mounting base and at the other set of their ends on spaced apart axes to said collector head to form a parallelogram linkage; and coil spring means contained on the arms and urging the arms about their pivot axes for engaging the collector head with a conductor bar, said coil spring means being several times longer than the distance between the spaced apart axes on said mounting base or on said collector head and extending diagonally between and along the center lines of said arms with opposite ends of the spring means connected to opposite arms so that the force the collector head exerts against the conductor bar remains substantially constant and relatively independent of the separation between the conductor bar and the mounting base of the collector assembly.

References Cited in the file of this patent
UNITED STATES PATENTS

| | | |
|---|---|---|
| 440,665 | Thomson | Nov. 18, 1890 |
| 520,156 | Brown | May 22, 1894 |
| 558,741 | Rabbitt | Apr. 21, 1896 |
| 588,488 | Sell | Aug. 17, 1897 |
| 890,421 | Gross | June 9, 1908 |
| 976,942 | Speck et al. | Nov. 29, 1910 |
| 1,138,965 | Lynch | May 11, 1915 |
| 1,557,913 | Woodring | Oct. 20, 1925 |
| 1,893,383 | Way | Jan. 3, 1933 |
| 1,918,854 | Mead | July 18, 1933 |
| 2,700,705 | Anjeskey et al. | Jan. 25, 1955 |